United States Patent [19]
Belcher et al.

[11] Patent Number: 5,767,392
[45] Date of Patent: Jun. 16, 1998

[54] METHOD AND APPARATUS FOR LEAK TESTING CONTAINERS HAVING A FLEXIBLE SIDE WALL STRUCTURE

[75] Inventors: William David Belcher, Stock Bridge; Thomas Eugene Wigley, Morrow, both of Ga.

[73] Assignee: The Clorox Company, Oakland, Calif.

[21] Appl. No.: 909,484

[22] Filed: Aug. 12, 1997

Related U.S. Application Data

[63] Continuation-in-part of Ser. No. 704,293, Aug. 28, 1996, abandoned.

[51] Int. Cl.[6] .................................................. G01M 3/36
[52] U.S. Cl. ............................ 73/41; 73/49.3; 73/45.4
[58] Field of Search ............................... 73/41, 45, 45.1, 73/49.3, 52, 45.4

[56] References Cited

U.S. PATENT DOCUMENTS

| | | | |
|---|---|---|---|
| 3,396,842 | 8/1968 | Bowen et al. | 209/73 |
| 3,847,014 | 11/1974 | Mistarz | 73/45.4 |
| 4,024,956 | 5/1977 | Cassidy | 209/73 |
| 4,697,452 | 10/1987 | Prakken | 73/49.3 |
| 4,756,184 | 7/1988 | Reishus et al. | 73/45.4 |
| 4,862,732 | 9/1989 | Raymond et al. | 73/45.4 |
| 4,864,848 | 9/1989 | Irvine | 73/45.4 |
| 5,542,288 | 8/1996 | Fenlon | 73/49.3 |

FOREIGN PATENT DOCUMENTS

| | | | |
|---|---|---|---|
| 0230367 | 7/1987 | European Pat. Off. | G01L 11/00 |
| 2422526 | 11/1975 | Germany | 73/49.3 |

*Primary Examiner*—Michael Brock
*Attorney, Agent, or Firm*—Ralph C. Francis

[57] ABSTRACT

A method and apparatus for leak testing a closed container having a substantially flexible wall structure wherein a compressive force is applied to the wall structure such that the wall structure is displaced from a first position to a second position. The compressive force is maintained for a pre-determined first period of time to stabilize the container wall structure. After the stabilization period, the compressive force is released wherein the wall structure commences recovery from the second position toward the first position. The wall structure recovery from the second position is measured at a pre-determined second period of time.

26 Claims, 8 Drawing Sheets

METHOD AND APPARATUS FOR LEAK TESTING CONTAINERS HAVING A FLEXIBLE SIDE WALL STRUCTURE

This is a Continuation-In-Part of application Ser. No. 08/704,293, filed Aug. 28, 1996, now abandoned.

FIELD OF THE PRESENT INVENTION

The present invention relates in general to non-destructive testing of containers for leaks. More particularly, the present invention relates to a method and apparatus for high speed in-line leak testing of flexible containers.

BACKGROUND OF THE INVENTION

The principles of the invention described herein provide for high speed in-process quality control leak testing of sealed substantially, filled (i.e., ≦95% liquid) containers. However, as will be appreciated by one having ordinary skill in the art, the principles described herein also provide for leak testing sealed containers having 100% gas therein.

Since the degree of integrity required for each container may differ for each application, an ideal testing system must provide a means of sorting sealed containers based on acceptable limits. Furthermore, the system must have the capability of handling various container configurations and material characteristics.

From a manufacturing viewpoint, the ideal system must measure the rate of leak in units that can be easily programmed by an operator on a test console. Furthermore, it is desirable for this testing and sorting to be done automatically on a 100% inspection basis of all packages at high speed (i.e., >100 containers a minute). Finally, it is imperative that the test equipment be capable of performing the leak testing and sorting without damage to the sealed container and its contents.

Numerous methods and systems have been employed to nondestructively test containers for leaks. Such systems primarily operate on either the trace gas principle or the bulging wall principle, in which case the container is placed in an evacuated chamber. Illustrative are the systems disclosed in U.S. Pat. Nos. 3,837,215, 3,343,404, 5,287,729, 3,091,114 and 3,591,944.

Neither of the noted principles are, however, satisfactory for high speed in-process quality control leak testing on a non-destructive basis. It is well known that the trace gas principle is limited to very slow speed operation.

The bulging wall principle (or technique) is also limited by virtue of its sensitivity to normal container variables such as wall thickness, internal container pressure, strength of container, volume of the container, etc. These variables are typically outside the control of the testing equipment and significantly effect the accuracy of the technique.

For example, in the systems described in U.S. Pat. Nos. 3,837,215 and 3,343,404, the container walls are caused to bulge when subjected to externally reduced pressure. Since the amount of wall bulge is directly related to wall thickness, modulus of elasticity, internal container pressure, external container pressure, area of the wall, wall contour markings, uniformity, etc., it follows that a container with thin walls will expand more than one with thick walls. Thus, if the thick and thin containers have the same leak rate, the thin wall container will expand much further. Any attempt to compensate by adjusting the sensing switch at a point halfway between the travel range limits of the thin wall versus thick wall container results in a serious compromise of classification, accuracy and capability, causing the system to reject good units or accept bad units. Systems that operate on the bulge principle are thus useful only if the containers and their variables characteristics are very consistent from unit to unit.

Further, systems which operate on the bulge principal typically have no means for compensating for internal pressure variations. If containers with random internal pressures are passed through this type of measurement system, the variations in differential pressure will bulge the walls of each container differently and provide erroneous "leak" indications.

An additional system that has been employed involves measuring the amount or rate of inward deflection of a container wall structure resulting from the application of an inward force. This system also has significant drawbacks. Most significantly, the system is very sensitive to normal container variables such as wall thickness, internal container pressure, strength of container, etc.

Accordingly, it is a primary object of the present invention to provide a high speed method and apparatus for testing sealed containers for leaks by external analysis in-process, on line, and without requiring that the sealed container be opened, damaged, or permanently distorted.

It is another object of the present invention to provide such method and apparatus which is substantially independent of process operating variables such as container shape, wall thickness variations, internal pressurization or level of fill material.

It is another object of the invention to provide such method and apparatus which permits operator programming of an acceptable leak rate for the accept/reject sorting process.

SUMMARY OF THE INVENTION

In accordance with the above objects and those that will be mentioned and will become apparent below, the method for leak testing a container having a flexible wall structure comprises applying a compressive force to the flexible wall structure wherein the wall structure is displaced from a first position to a second position, maintaining the application of the compressive force for a pre-determined first period of time, releasing the compressive force wherein the wall structure commences recovery from the second position toward the first position, and measuring the wall structure recovery from the second position at a pre-determined second period of time.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE PREFERRED EMBODIMENT

The present invention substantially reduces or eliminates the above noted shortcomings associated with prior art apparatus and techniques. According to the method of the invention, at least one compressive force is applied to the flexible wall structure of a container wherein the wall structure is displaced from a first position to a second position. The compressive force is preferably maintained for a pre-determined stabilization period.

After the stabilization period, the compressive force is released and the container wall structure commences recovery from the second position toward the first position. At a pre-determined second period of time the wall structure recovery from the second container wall structure position is measured. As discussed in detail below, Applicants have found that the noted wall structure recovery provides an effective and reliable means for non-destructive, high speed, in-line quality control leak testing of closed containers.

Figure 1:
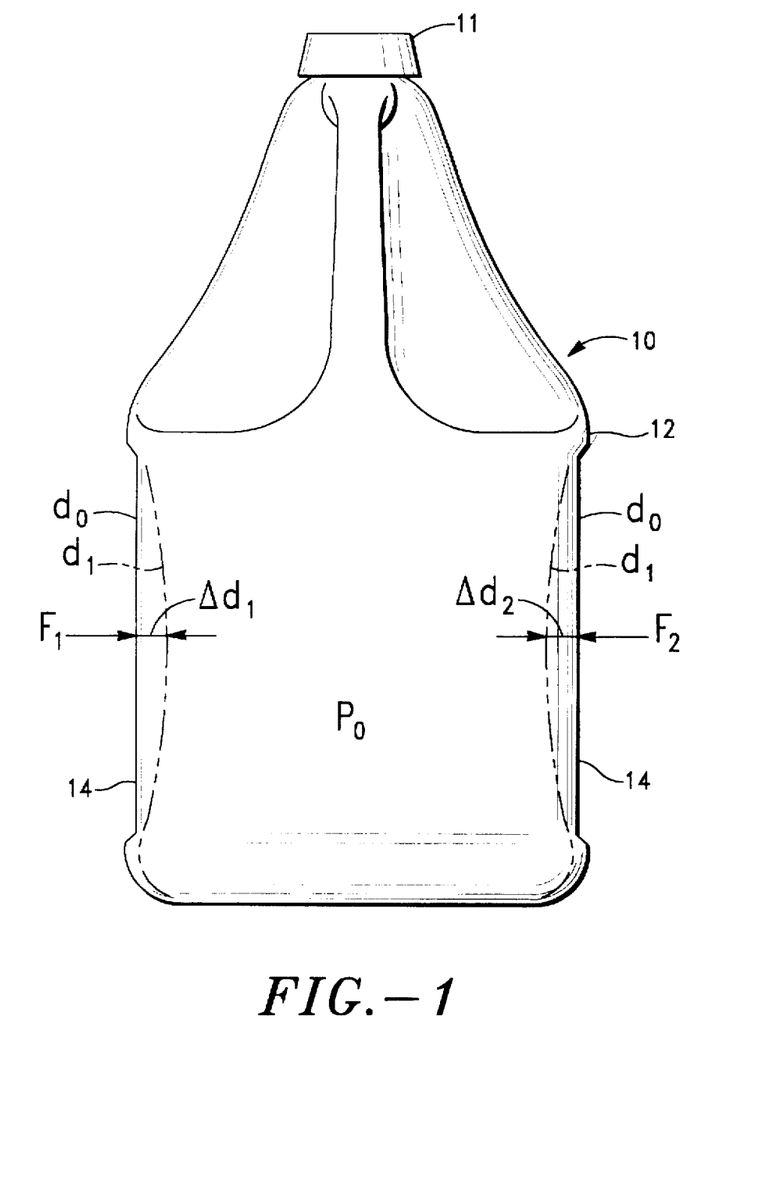
FIG. 1 is a rear elevational view of a container illustrating the inward deformation of the container wall structure resulting from an external compressive force.

Referring now to FIG. 1, there is shown a schematic illustration of a typical container 10. The container 10 includes a cap 11 and a body 12 having a wall structure area 14 which comprises a flexible, elastic material, such as polyethylene. For purposes herein, the container 10 is assumed to be substantially filled and has a head space volume $V_O$ and an external pressure $P_O$. In accordance with the method of the invention, the flexible wall structure area 14 of the container 10 is subjected to at least one compressive loading force, which deflects the wall structure 14 inwardly and reduces the volumetric capacity of the container 10. In a preferred embodiment, discussed in detail below, the container 10 is subjected to compressive forces $F_1$ and $F_2$ which are applied to the wall structure area 14 on opposite sides thereof.

As illustrated in FIG. 1, upon application of the compressive forces $F_1$, $F_2$, the container wall structure 14 (on both sides) is displaced from a first substantially normal state position (i.e., initial position) $d_0$ to a second, deflected position (i.e. displaced position d. Upon release of the forces $F_1$, $F_2$, the container wall structure 14 returns to its initial position) $d_0$.

Figure 10:
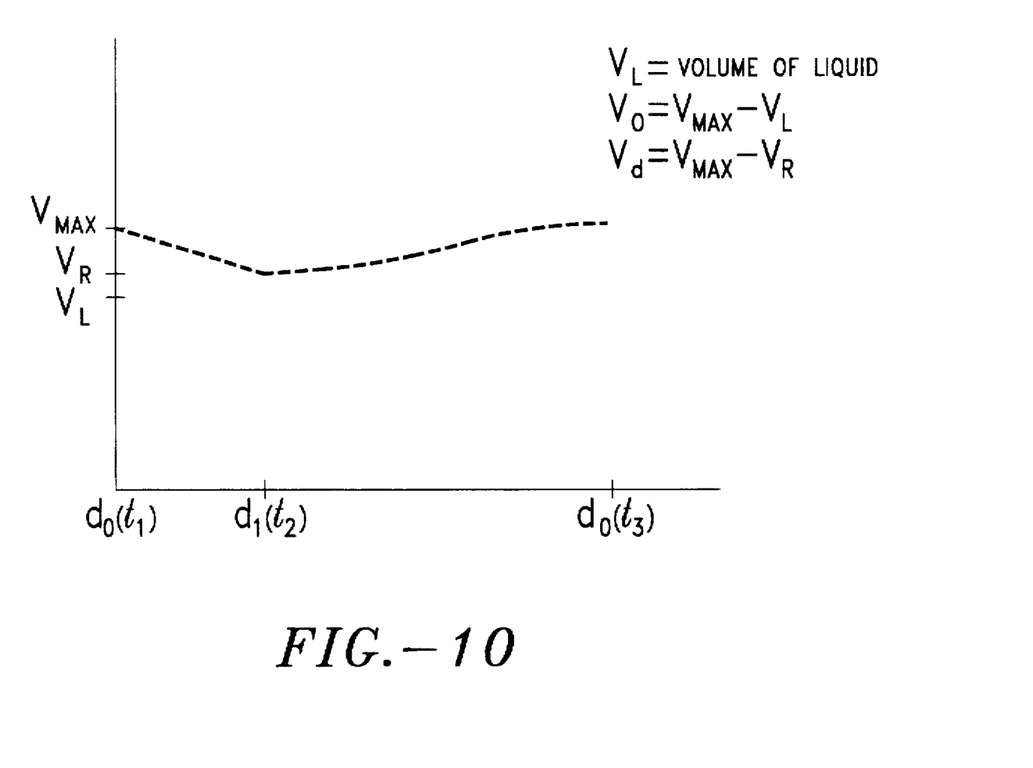
FIG. 10 is a graphical illustration of the change in volumetric capacity of a container subjected to an external force.

As illustrated in FIG. 10, upon application of the compressive forces $F_1$, $F_2$, the volume of the container 10 decreases from a maximum volume $V_{max}$ (at $d_0$, $t_1$) to a reduced volume $V_r$ (at $d_1$, $t_2$). Upon release of the compressive forces, the volume of the container 10 returns to $V_{max}$ (at $d_0$, $t_3$). As discussed in detail herein, according to the invention, the decrease in volume $V_d$ is preferably less than the volume of the head space $V_O$.

Figure 2:
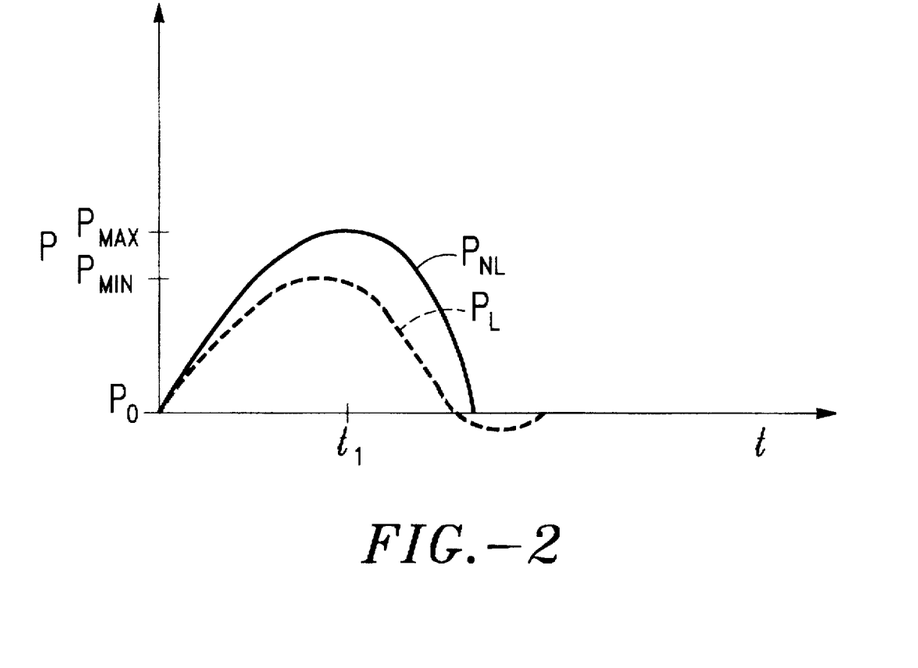
FIG. 2 is a graphical illustration of the change in internal pressure of a leaking and non-leaking container subjected to an external compressive force.

Referring now to FIG. 2, there is shown a schematic illustration of the change in internal pressure as a function of time for a container subjected to an external compressive force. For a non-leaking container (indicated by line $P_{NL}$), it can be seen that the internal pressure, which initially has the value $P_O$, increases to a maximum pressure $P_{max}$ upon application of the compressive loading force. Upon release of the loading force at $t_1$, the container pressure rapidly returns to the initial pressure $P_O$.

In the case of a leaking container (indicated by line $P_L$), upon application of the compressive loading force, a pressure $P_{min}$ would be achieved. As illustrated in FIG. 2, $P_{min}$ would be less than the maximum pressure for a non-leaking container ($P_{max}$). Further, upon release of the loading force, the transition of the container (i.e., recovery of container wall structure) to its original shape and stable value $P_O$ would require greater time as compared to a non-leaking container.

Figure 3:
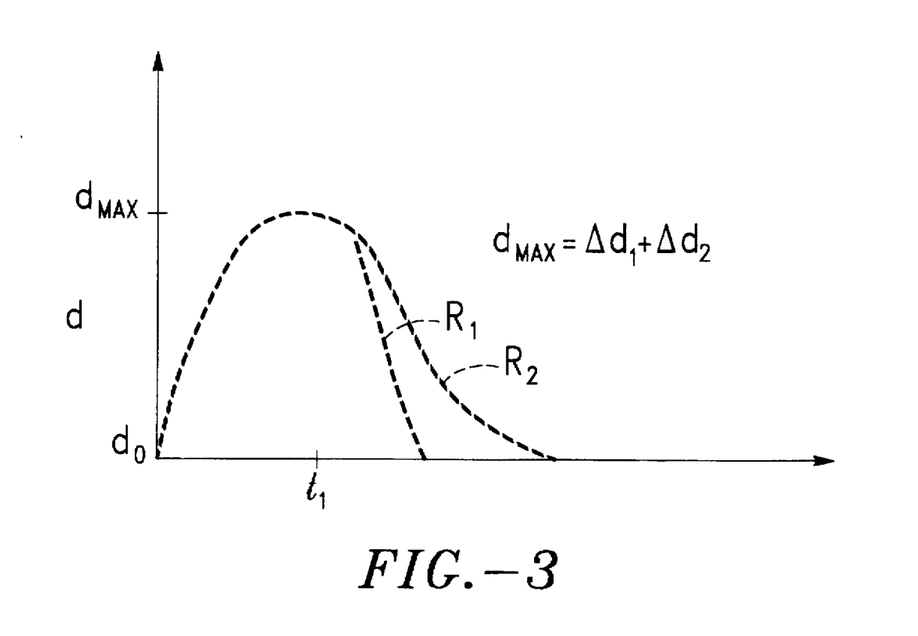
FIG. 3 is a graphical illustration of the rates of recovery for the wall structure of a leaking and non-leaking container.

Referring now to FIG. 3, there is shown a schematic illustration of the rates of recovery for the wall structure of a leaking and non-leaking container subjected to compressive loading, such as that shown in FIG. 1. As indicated, for a non-leaking container (indicated by line $R_1$) the rate of recovery of the container wall structure is very rapid. However, if the container contains a leak (indicated by line $R_2$), the rate of recovery is substantially reduced. Indeed, for a leaking container the rate of recovery could be extremely lengthy due to such factors as the external air pressure and capillary action of the leak orifice.

Applicants have found that the noted recovery characteristics of a container provide effective and reliable means for high speed in-process quality control leak testing of sealed containers. Applicants' unique testing method, discussed in detail below, is not described or suggested by any known testing method(s) or in any prior art reference.

According to the invention, the leak rate of a container—defined as the velocity of travel of the container wall structure from a deflected position to an initial normal (or steady state) position—is approximated by the following equation:

$$\text{Leak Rate } (LR) = \frac{d_{max}}{t_R}$$

where:

$d_{max}$=total recovery displacement of the container wall structure (e.g., $\Delta d_1 + \Delta d_2$ in FIG. 1)

$t_R$=total recovery time of $d_{max}$

As will be appreciated by one having ordinary skill in the art, numerous container variables can effect the recovery characteristics of a container. Such variables would include variations in wall thickness, strength of container, volume variations, modules, material heat treating, contour markings and external ambient pressure.

However, Applicants have found by comparing the leak rate (LR) of a container to a pre-set leak rate limit the effects of such variables are effectively cancelled. Indeed, Applicants have achieved approximately 98% leak detection accuracy by virtue of the unique leak testing methodology.

Figure 4:
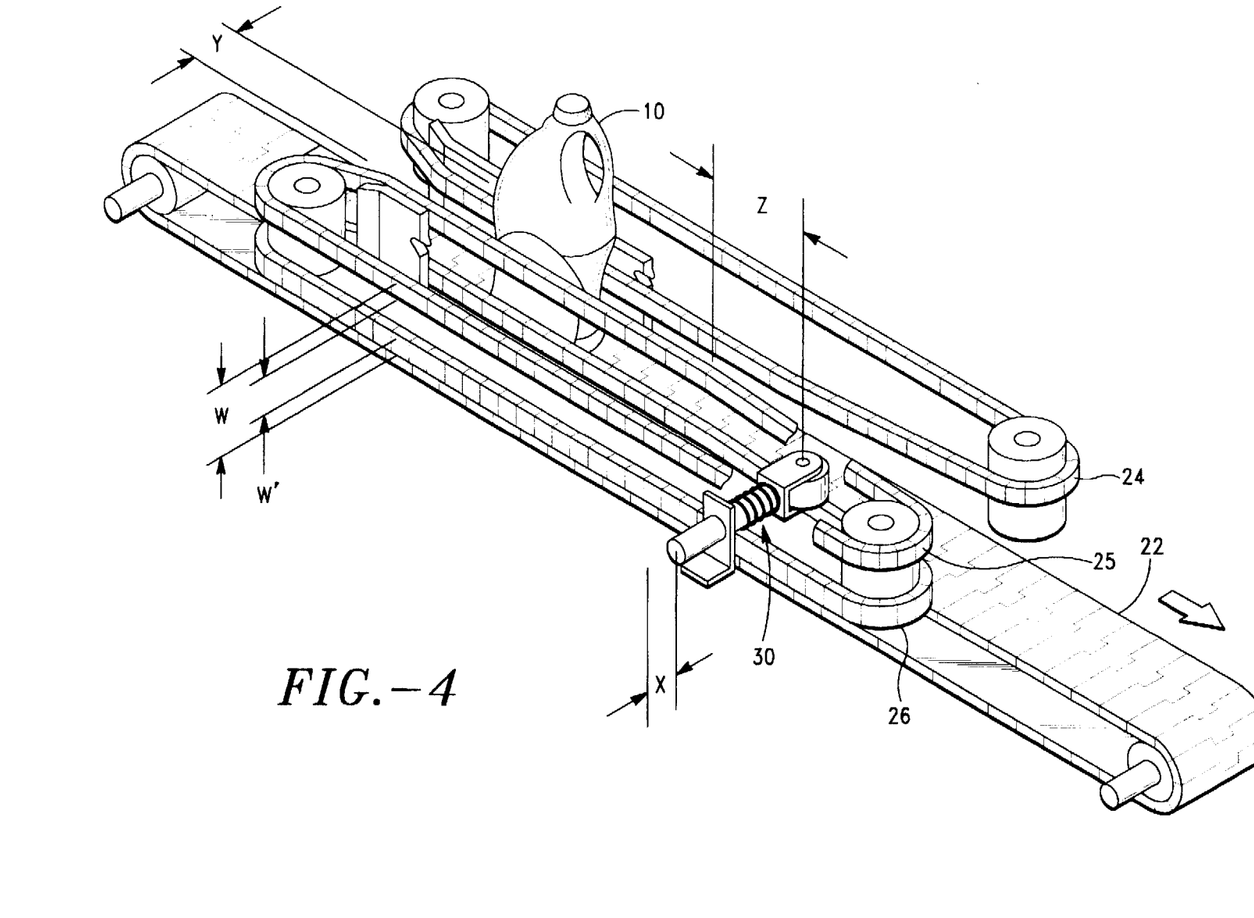
FIG. 4 is a perspective view of a preferred embodiment of the leak testing apparatus according to the invention.
Figure 5:
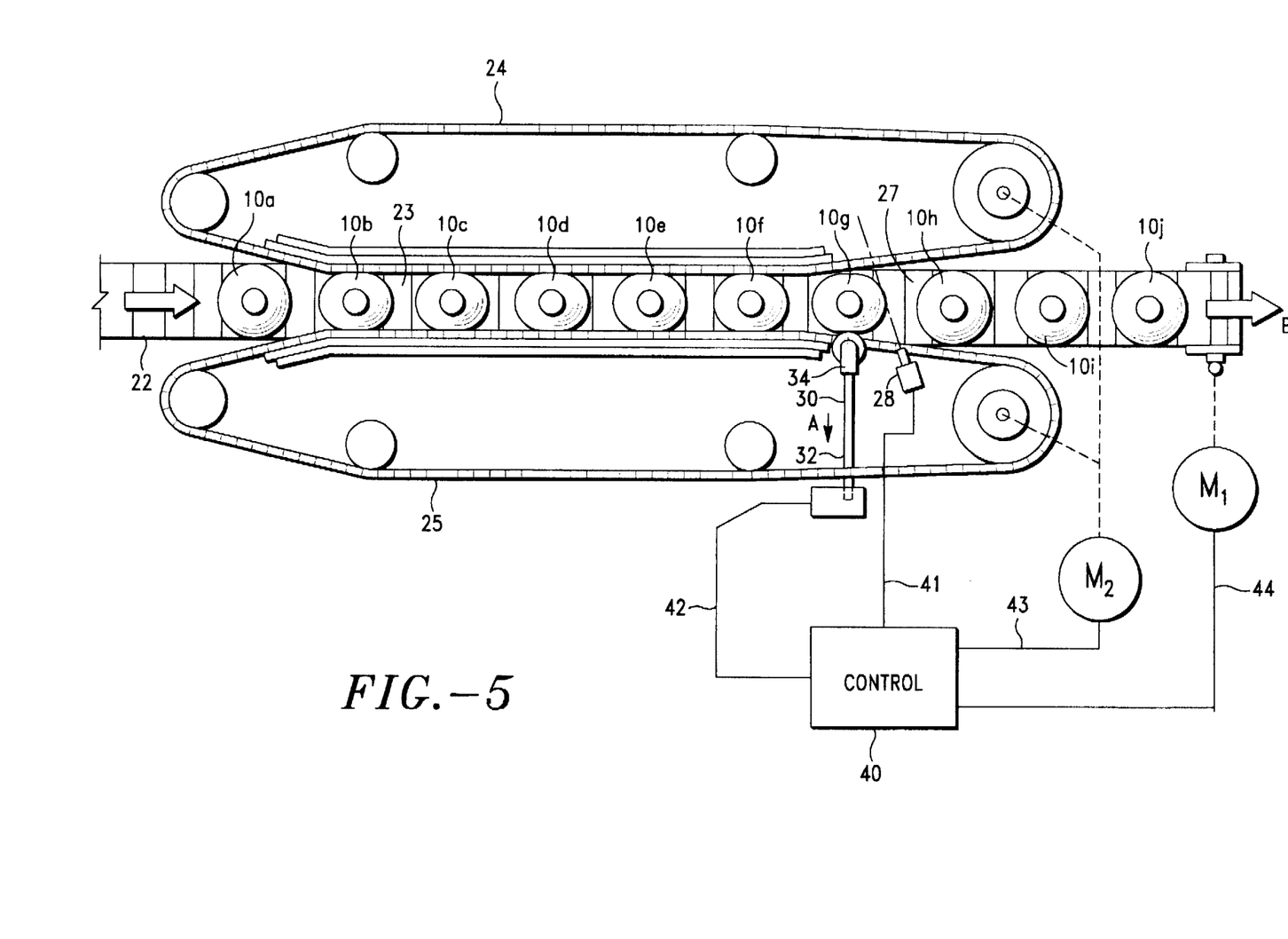
FIG. 5 is a plan view of the apparatus illustrated in FIG. 4.

Referring now to FIGS. 4 and 5, there is shown a preferred leak testing apparatus 20 according to the invention. The leak testing apparatus includes a conveyer system 22 for transporting the containers 10a–10j, a container compression system, a proximity sensor 28, a recovery detector 30 and a control unit 40.

As illustrated in FIG. 4, the container compression system preferably includes three compression chains disposed proximate the conveyor system 22. A first compression chain 24, a second compression chain 25 and a third compression chain 26. The second 25 and third 26 compression chains are positioned in parallel and opposite the first compression chain 24 (a distance Y). Preferably, the first chain 24 is positioned directly across from and substantially central to the space between chains 25, 26, denoted W'.

According to the invention, the outside dimension of the compression chains 25, 26 (denoted W in FIG. 4), which defines the width of the compressive force surface area, is preferably in the range of about 3.5 to about 4.5 inches. The width of compressive force surface area W is however readily adjustable to accommodate different shape containers and modes of container deformation.

As illustrated in FIG. 5, the chains 24, 25, 26 are also substantially aligned in parallel along the vertical axes thereof. According to the invention, the distance between chains 25, 26 and chain 24 (denoted Y in FIG. 4) is similarly readily adjustable to accommodate different shape containers and apply the predetermined compressive forces, discussed in detail below.

As will be appreciated by one having ordinary skill in the art, the chains 24, 25, 26 may comprise various materials, such as various metals or polymeric materials, and have various shapes, such as a conventional continuous belt. In a preferred embodiment, the chains comprise a conventional, continuous chain, having a flat surface approximately 1.0–1.5 inches wide.

In an additional envisioned embodiment of the invention, not shown, two compression chains are employed to produce the pre-determined compressive forces. In additional embodiments, four or more compression chains are employed. The chains are similarly positioned in parallel and opposite each other.

As illustrated in FIG. 5, the leak testing apparatus 20 of the invention is further provided with motors $M_1$ and $M_2$ to actuate the conveyer system 22 and compression belts 24, 25, 26. The motors $M_1$, $M_2$ are operatively connected to the apparatus control system 40 via lines 43, 44, respectively. According to the invention, the control system 40 monitors and regulates the speed of the motors $M_1$, $M_2$, and maintains the synchronization of the belts 24, 25, 26 and conveyer system 22.

Two additional and key components of the leak testing apparatus 20 are the proximity sensor 28 and recovery detector 30. According to the invention, the proximity sensor 28 is designed and adapted to detect the pre-set recovery position of a container (e.g., container 10g) on the conveyer system 22. As discussed in detail below, the recovery detector 30 is designed and adapted to measure the recovery of the containers 10a–10j after application of the compressive forces.

The proximity sensor 28 and recovery detector 30 are similarly connected to the control system 40. During operation, output from the proximity sensor 28 and recovery detector 30 is transmitted to the control 40 via lines 41, 42, respectively.

As will be appreciated by one having ordinary skill in the art, a variety of sensors (and number thereof) may be employed to detect the position of the containers 10a–10j, such as travel, force, speed, acceleration or pressure or tension sensors which are of a conventional construction for generating a measured value signal such as capacitive or inductive proximity sensor, opto-electrical sensor, etc. In a preferred embodiment, the proximity sensor 28 comprises an opto-electrical sensor.

Similarly, a variety of detector devices (or sensors) are suitable for measuring the recovery or recovery rate of a container wall structure. Such detectors may include a paddle device, plunger or various arm configurations. In a preferred embodiment, the recovery detector 30 comprises a spring loaded electro-mechanical sensor having an elongated arm 32 with a roller 34 disposed on one end thereof (see FIG. 6). As discussed in detail below, the detector 30 is designed and adapted to traverse the container wall structure 14 (moving axially in response thereto in the direction denoted by arrow A) and measure the recovery thereof (denoted distance X in FIG. 4) during high speed processing.

Figure 6:
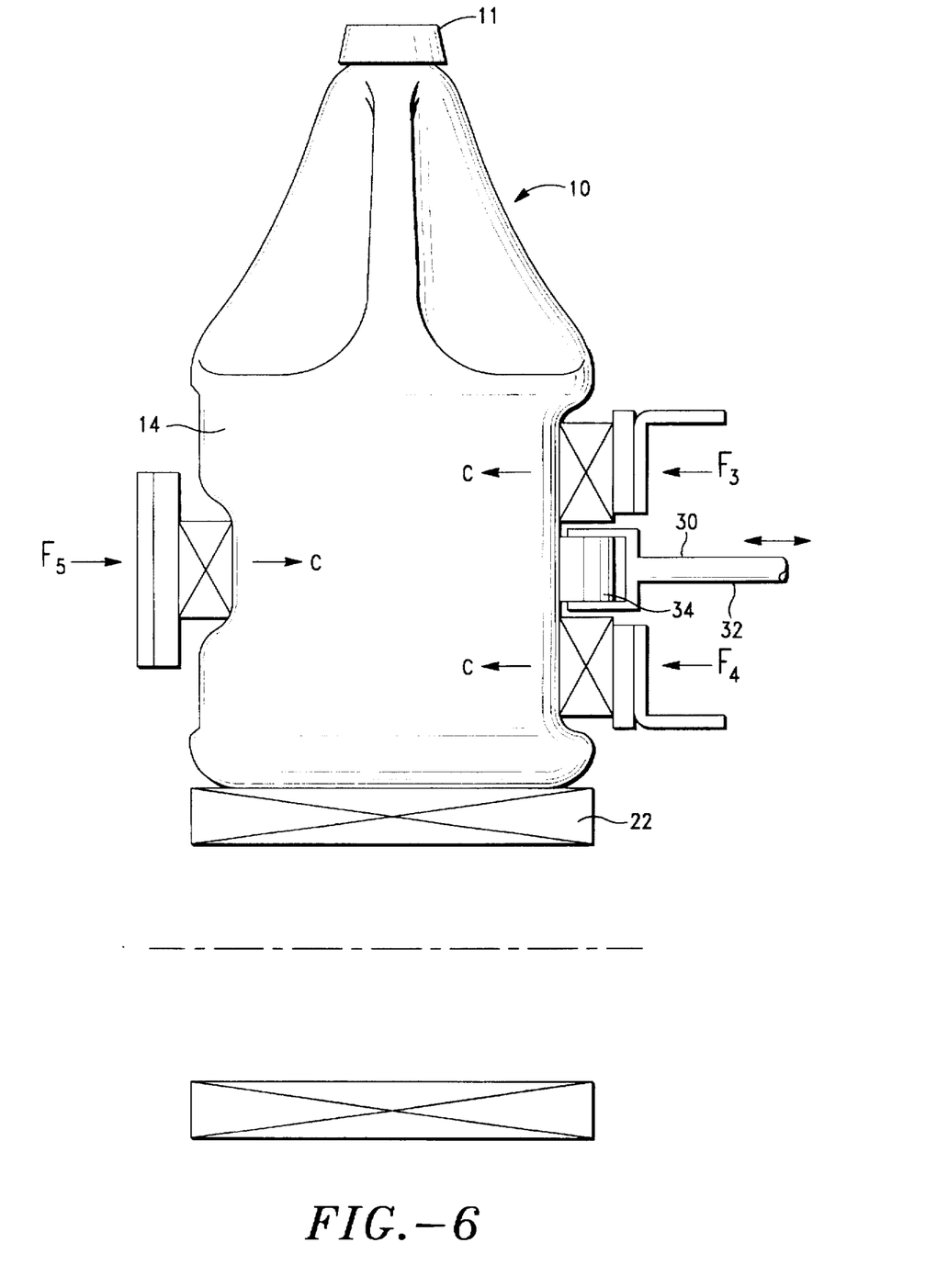
FIG. 6 is a rear elevational view of a container subjected to external compressive forces, according to the invention.

In operation, a plurality of containers 10a–10j are positioned on and transported by the conveyer system 22. The containers 10a–10j move in the direction denoted by arrow B and enter into the compression zone 23 created by compression belts 24, 25, 26. As the containers 10b–10f traverse the compression zone 23, each container is subjected to compressive forces $F_3$, $F_4$, $F_5$, by virtue of the spacial alignment (i.e., distance Y) of the compression belts 25, 26 and compression belt 24. As illustrated in FIG. 6, the forces $F_3$, $F_4$, $F_5$ are preferably applied along a plane substantially perpendicular to the vertical axis of each container 10b–10f and normal to the side wall structure thereof. As a result of the compressive forces $F_3$, $F_4$, $F_5$, the container wall structure 14 of each container 10b–10f is displaced inwardly (in a direction denoted by arrow C). According to the invention, the total amount of wall structure displacement is in the range of approximately 5% to 15% of the container width preferably, approximately 9% to 12%.

As discussed above, compressive forces $F_3$, $F_4$, $F_5$, also produce a decrease in volumetric capacity (by virtue of the wall structure displacement) of each container 10b–10f. According to the invention, the decrease in volume is preferably less than the volume of the container head space (see FIG. 10).

As a result of the noted minimal decrease in volumetric capacity during application of the compressive forces (or loads), fluid discharge is substantially reduced or eliminated, which preserves the integrity of the container. Most leaks detected by Applicants' method are thus readily addressed (e.g. tightening the cap) without the necessity of completely recycling the container. Indeed, as will be appreciated by one having ordinary skill in the art, most leaks result from loose or misaligned container caps.

The containers 10b–10f are maintained in the compression zone 23 for a predetermined amount of time to stabilize the containers 10b–10f. Applicants have found that such stabilization is necessary to accurately and reliably assess the container recovery and, hence, leak rate.

According to the invention, the containers 10b–10 f are maintained in the compression zone 23 for a period in the range of approximately 0.5 to 4.0 seconds. Although longer stabilization periods may be employed, such extended periods are not necessary. Preferably, the containers 10b–10f are maintained in the compression zone 23 for approximately 0.75 to 2.0 seconds.

After the containers 10b–10f traverse the compression zone 23, they enter into the transition zone 27 of the compression belts 24, 25, 26. As illustrated in FIG. 5, the transition zone 27 comprises the area where the spacing between compression belts 24, 25 and compression belt 26 (denoted Y in FIG. 4) increases and, hence, the compressive forces $F_3$, $F_4$, $F_5$ decrease. According to the invention, the transition zone 27 facilitates full release of the compressive forces $F_3$, $F_4$, $F_5$, allowing full recovery of a non-leaking container 10g–10h disposed therein.

The transition zone 27 is further adapted to facilitate partial release of the compressive forces $F_3$, $F_4$, $F_5$, allowing partial recovery of a container 10g–10b disposed therein. As will be appreciated by one having ordinary skill in the art, such partial release of the compressive forces $F_3$, $F_4$, $F_5$ could, and in many instances would, be desirable for assessing the wall structure recovery of various containers (e.g., thin wall, low modulus).

As will be further appreciated by one having ordinary skill in the art, the length of the transition zone 27 is a function of the amount of container deflection and the conveyer system 22 speed. For example, Applicants have found that a transition zone 27 in the range of 2.5 inches to 3.5 inches is optimum for a container wall structure displacement in the range of 10%–15% of the container width and a conveyer system 22 speed in the range of 120–200 ft./min. The noted transition zone 27 readily accommodates the rapid recovery times of non-leaking containers. Indeed, Applicants have found that over 98% of non-leaking containers will recover their original shape after being subjected to the above referenced forces in approximately 0.05 to 1.0 second.

Referring now to FIG. 5, as each container 10a–10j traverses the transition zone 27, the proximity sensor 28 detects the presence thereof. According to the invention, the proximity sensor 28 is positioned within the transition zone 27 to detect the pre-set position of a container, such as container 10g, where full recovery of a non-leaking container would be achieved (denoted distance Z in FIG. 4). As will be appreciated by one having skill in the art, the pre-set recovery position is similarly a function of the amount of container deflection and conveyer speed. For example, in the embodiment discussed above, the pre-set, full recovery position is approximately 3.0 to 3.25 inches aft of the compression zone 23 (i.e., approximately 0.05 to 1.0 seconds after the initial release of compressive loads $F_1$, $F_2$, $F_3$).

As illustrated in FIG. 5, the recovery detector 30 is similarly positioned within the transition zone 27 and, as discussed above, is adapted to traverse the wall structure of a container (e.g., container 10g) at the pre-set full recovery position of a non-leaking container. According to the invention, the proximity sensor 28 detects the presence of container 10g substantially simultaneously with recovery detector 30 engagement of the container 10g wall structure 14 (see FIG. 6).

Figure 9:
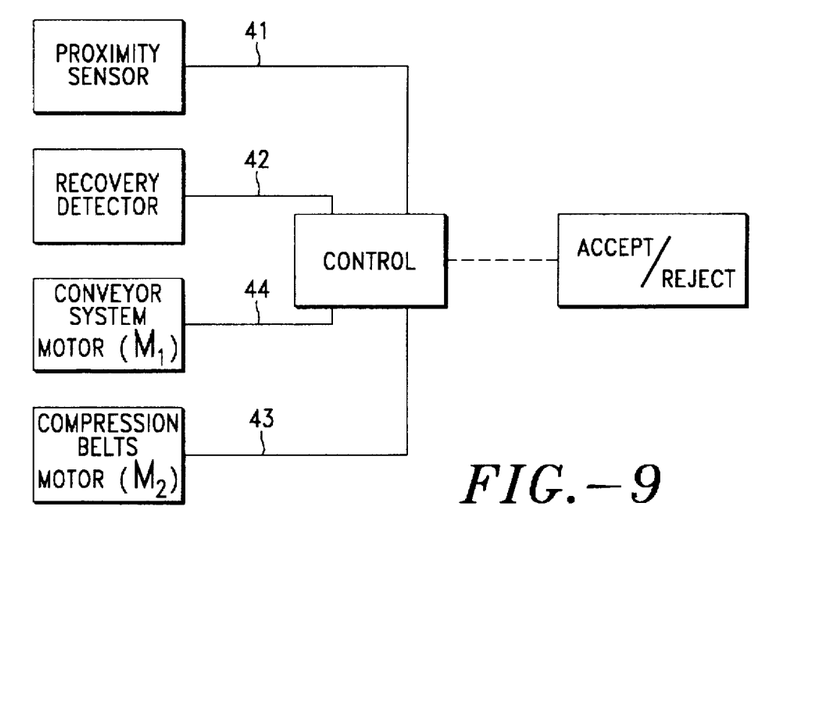
FIG. 9 is a schematic illustration of the leak testing apparatus control system, according to the invention.

Referring now to FIG. 9, output from the proximity sensor 28 is transmitted via line 41 to the control system 40. Output from the recovery detector 30 is similarly transmitted via line 42 to the control system 40. Upon receipt of the output signals from the sensor 28 and detector 30, the control system 40 conducts a comparative analysis of the detector 30 signal and a pre-set leak rate limit.

Figure 7:
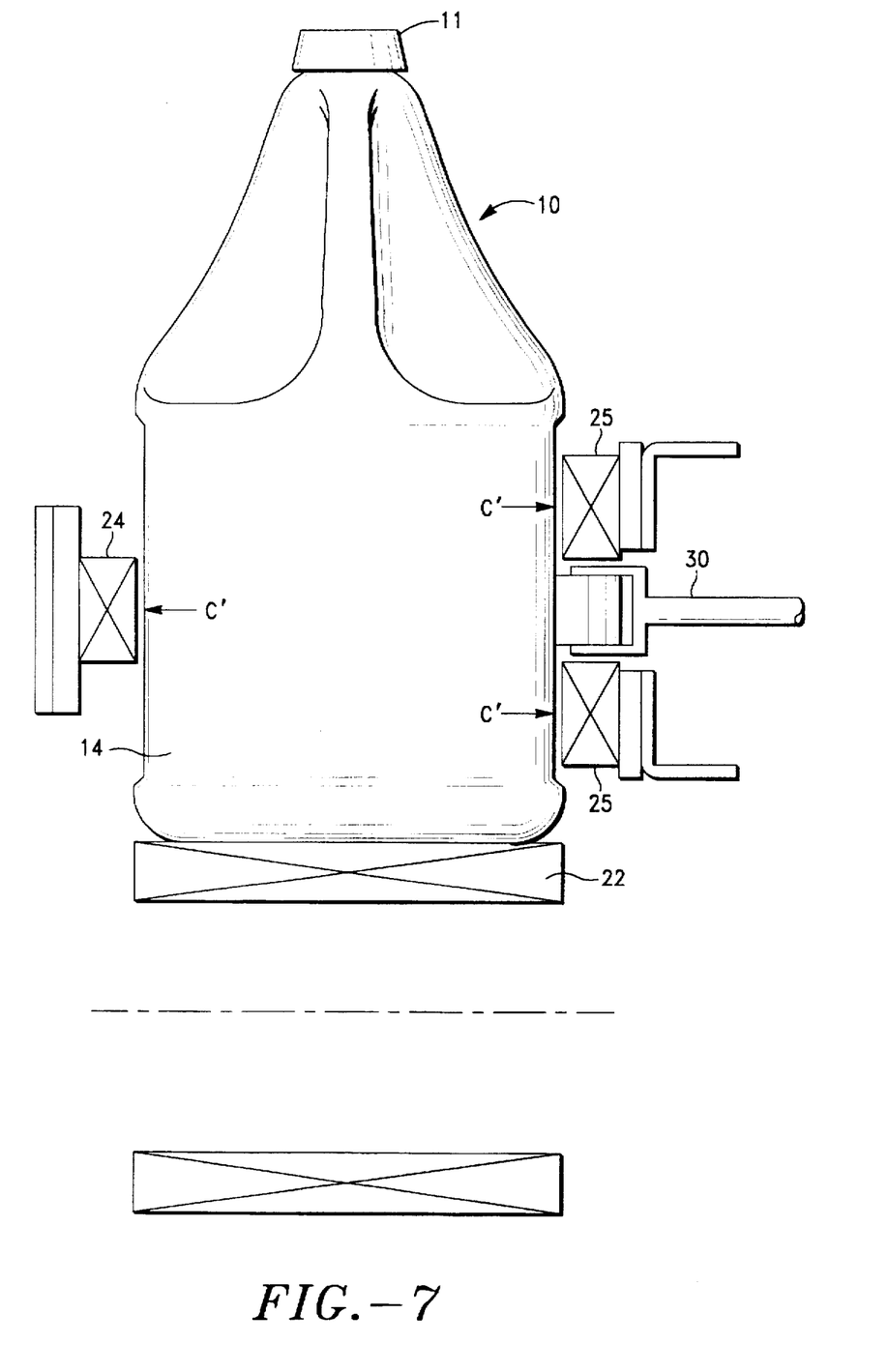
FIG. 7 is a rear elevational view of a fully recovered non-leaking container upon release of the compressive forces illustrated in FIG. 6.

As discussed above, if container 10g is absent any leaks, upon detection by the proximity sensor 28, full recovery of the container wall structure (in the direction denoted C') would be substantially achieved at the pre-set full recovery position (see FIG. 7). The recovery detector 30 output signal would accordingly indicate such and the control system, after conducting the comparative analysis, would provide an "accept" signal.

Figure 8:
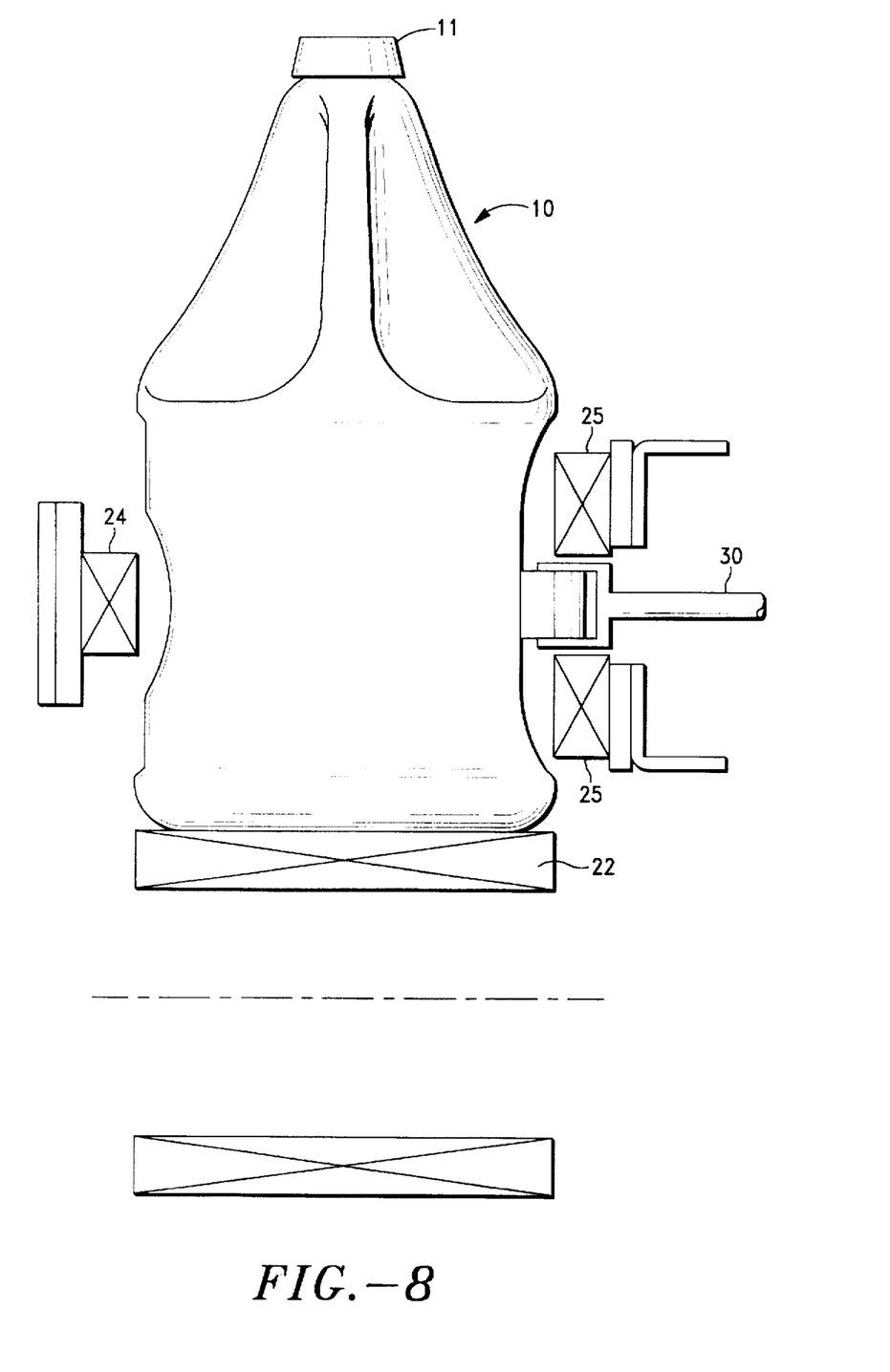
FIG. 8 is a rear elevational view of a partially recovered leaking container.

If the output signal from the recovery detector 30 indicates that container 10g did not achieve an acceptable amount of recovery (see FIG. 8), the control system 40 would provide a "reject" signal. However, by virtue of the non-destructive nature of Applicants' testing method, the leaking container could simply be re-processed (i.e., resealed).

SUMMARY

From the foregoing description, one of ordinary skill in the art can easily ascertain that the present invention provides a novel method and apparatus for high speed, in-process, non-destructive leak testing of containers. The method and apparatus uniquely employ the recovery characteristics of a container wall structure subjected to compressive forces.

Applicants' unique leak testing method also substantially reduces or eliminates the effects of container variables that are not controllable by the testing equipment. In this manner, the measured recovery (and, hence, leak rate) is not degraded by such uncontrolled variables as internal pressure variations, wall thickness, etc.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A method for leak testing containers having a flexible side wall structure at least at certain areas thereof, comprising the steps of:

applying at least one compressive force to said flexible side wall structure, said compressive force producing a total dimensional change of said wall structure from a first substantially normal state position to a second deflected position in the range of approximately 5% to 15% of the container width;

maintaining said application of said compressive force for a first period of time;

releasing said compressive force, wherein said wall structure commences recovery from said second position toward said first position; and measuring said wall structure recovery from said second position at a second period of time.

2. The method of claim 1, further comprising the step of measuring said dimensional change of said wall structure from said second position to said first position.

3. The method of claim 1, wherein said dimensional change of said side wall structure from said first position to said second position is in the range of approximately 9% to 12% of the container width.

4. The method of claim 1, wherein a plurality of compressive forces are applied to a substantial portion of said container flexible wall structure.

5. The method of claim 1, wherein said first period of time is in the range of approximately 0.5 to 4.0 seconds.

6. The method of claim 1, wherein said second period of time is in the range of approximately 0.5 to 1.0 second.

7. A method of leak testing closed containers having a flexible side wall structure, comprising the steps of:

applying a pair of substantially opposing compressive loads to said container flexible side wall structure, each of said compressive loads being applied to a substantial portion of said container side wall structure substantially along a plane substantially perpendicular to the vertical axis of said container and normal to said side wall structure, said compressive loads producing a maximum total dimensional change of said flexible side wall structure from a first substantially normal state position to a second deflected position in the range of approximately 9% to 12% of the container width;

maintaining said application of said compressive loads for a period in the range of approximately 0.5 to 4.0 seconds;

releasing said compressive loads; and measuring the rate of change of the deflection of said side wall structure upon release of said compressive loads.

8. The method of claim 7, wherein said compressive loads are substantially equal.

9. The method of claim 7, wherein said rate of change of said side wall structure is measured in approximately 0.5 to 1.0 second upon said release of said compressive loads.

10. A method for leak testing closed containers having a flexible side wall structure and a head space therein, comprising the steps of:

decreasing the volume of the container by applying at least one compressive force to the container flexible side wall structure, said decrease in volume being less than the volume of the container head space;

maintaining said application of said compressive force for a first period of time;

releasing said compressive force; and measuring the rate of change of the container side wall structure upon release of the compressive force.

11. The method of claim 10, wherein said compressive force produces a maximum total dimensional change of said flexible side wall structure from a first substantially normal state position to a second deflected position less than approximately 15% of the container width.

12. The method of claim 10, wherein said rate of change of said side wall structure is measured in approximately 0.5 to 1.0 second upon said release of said compressive force.

13. An apparatus for leak testing closed containers having a top, bottom and flexible side wall structure, comprising:

means for applying at least one compressive load to said container side wall structure, said compressive load being applied to a substantial portion of said side wall structure substantially along a plane substantially perpendicular to the vertical axis of said container and normal to said side wall structure, said compressive load producing a total dimensional change of said wall structure from a first substantially normal state position to a second deflected position in the range of approximately 5% to 15% of the container width;

means for abutting said container which is adapted to hold said container during application of said compressive load;

means for maintaining said application of said compressive load for a first period of time; and sensor means for detecting time dependent deformation of said container flexible side wall structure upon release of said compressive load.

14. The apparatus of claim 13, wherein two substantially opposing compressive loads are applied to a substantial portion of said flexible side wall structure.

15. The apparatus of claim 14, wherein each of said compressive loads are applied substantially along a plane substantially perpendicular to the vertical axis of said container and normal to said side wall structure.

16. The apparatus of claim 15, wherein said opposing compressive loads are substantially equal.

17. The apparatus of claim 13, wherein said first period of time is in the range of approximately 0.5 to 4.0 seconds.

18. The apparatus of claim 13, wherein said dimensional change of each of said side wall structures from said first position to said second position is in the range of approximately 9% to 12% of the container width.

19. An apparatus for leak testing a plurality of closed containers having a flexible side wall structure, comprising:

a conveyer system for transporting said plurality of containers;

means for applying at least one compressive load to said flexible side wall structure of each of said containers during said conveyer system transport of said containers, said compressive load being applied substantially along a plane substantially perpendicular to the vertical axis of each of said containers and normal to each of said side wall structures, said compressive load providing a maximum total dimensional change of said side wall structure from a first substantially normal state position to a second deflected position less than approximately 15% of the container width;

means for maintaining said compressive load for a first period of time;

means for releasing said compressive load;

at least one proximity sensor for detecting the position of at least one of said containers on said conveyer system; and a recovery detector for measuring the recovery of each of said container side wall structures upon release of said compressive load.

20. The apparatus of claim 19, wherein said recovery detector comprises a spring loaded electro-mechanical sensor.

21. The apparatus of claim 19, wherein said compressive load means comprises at least one compression chain.

22. The apparatus of claim 19, wherein said compressive load means comprises three compression chains, said compression chains being positioned whereby at least one of said chains is disposed in parallel to and opposite said second and said third compression chains.

23. The apparatus of claim 22, wherein said apparatus includes a first motor system to control the speed of said conveyer system and a second motor system to control the speed of said compression chains.

24. The apparatus of claim 23, wherein said apparatus further includes processor means for monitoring and regulating the speed of said first and said second motor systems, said processor being further adapted to compare the rate of recovery of each of said containers with a pre-selected rate and responsive thereto providing an indication of the accept/reject status of each of said containers.

25. The apparatus of claim 19, wherein said compressive load is applied to each of said container wall structures for a period in the range of approximately 0.5 to 4.0 seconds.

26. The apparatus of claim 19, wherein said recovery detector measures the recovery of each of said container wall structures at approximately 0.05 to 1.0 second upon release of said compressive load.

* * * * *